No. 756,392. PATENTED APR. 5, 1904.
D. McCAUSLAND.
WHEEL GUARD OR FENDER.
APPLICATION FILED OCT. 5, 1903.
NO MODEL.
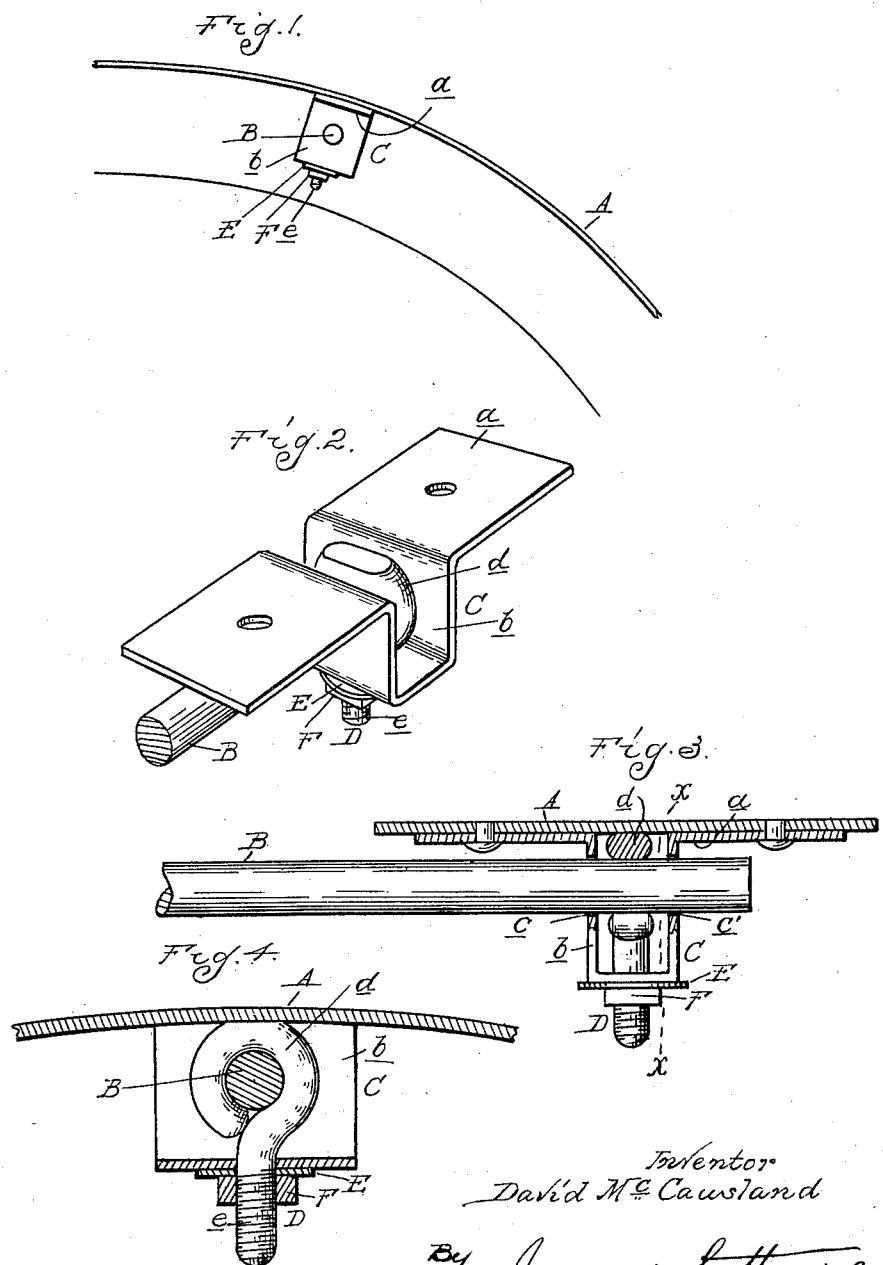

No. 756,392. Patented April 5, 1904.

UNITED STATES PATENT OFFICE.

DAVID McCAUSLAND, OF DETROIT, MICHIGAN, ASSIGNOR TO BRISCOE MANUFACTURING COMPANY, OF DETROIT, MICHIGAN, A CORPORATION OF MICHIGAN.

WHEEL GUARD OR FENDER.

SPECIFICATION forming part of Letters Patent No. 756,392, dated April 5, 1904.

Application filed October 5, 1903. Serial No. 175,869. (No model.)

*To all whom it may concern:*

Be it known that I, DAVID McCAUSLAND, a citizen of the United States, residing at Detroit, in the county of Wayne and State of Michigan, have invented certain new and useful Improvements in Wheel Guards or Fenders, of which the following is a specification, reference being had therein to the accompanying drawings.

It is the object of the invention to obtain the construction of a fender or guard for wheels which will permit of being quickly attached and adjusted to the vehicles to which it is applied and which is exceedingly simple in construction.

The invention consists in the means employed for attaching the fender to the securing-shank and in the peculiar construction, arrangement, and combination of parts, as hereinafter set forth.

In the drawings, Figure 1 is a diagram elevation of the guard or fender, showing the manner of adjusting it in relation to the wheel. Fig. 2 is a perspective view of the securing means for attaching the fender to its supporting-shank. Fig. 3 is a cross-section through the guard; and Fig. 4 is a section on line $x\,x$, Fig. 3.

A is the guard or fender, and B is the shank or arm which supports the fender in proper relation to the wheel.

For securing the guard to the shank a bifurcated bearing is attached to the under face of the guard and is adapted to receive a portion of the shank extending transversely to the guard. This, as shown, is formed by the bracket C, preferably struck up from sheet metal and having the securing-flanges $a$, riveted or otherwise secured to the guard, and a central downwardly-projecting U-shaped portion $b$, which is apertured at $c$ and $c'$ for the reception of a shank.

D is a clamping-bolt, which is provided with an eye-shaped head $d$, which is arranged between the furcations of the bracket and in line with the apertures $c$ and $c'$, being sleeved upon the shank B. The bolt D has a threaded shank $e$, which passes downward through an aperture in the U-shaped portion $b$ of the bracket.

E is a washer on the shank of the bolt, and F is a clamping-nut.

With the construction described it will be understood that by tightening the clamping-nut F the eye $d$ of the bolt D will draw downward the shank in the bifurcated bearing, so as to securely clamp the same in any position of adjustment. Thus the guard may be placed at any inclination desired and then secured in this position by the tightening of the nut F.

What I claim as my invention is—

1. In a wheel guard or fender the combination with a shank or supporting-arm and the guard of a bifurcated bearing formed on the under side of said guard and adapted to receive said shank and a clamping-screw engaging said shank intermediate the furcations of said bearing.

2. In a wheel guard or fender the combination with a shank and the guard of a bifurcated bracket depending from said guard and having alined apertures in the furcations thereof for the passage of said shank, an eyebolt sleeved on said shank intermediate the furcations of said bracket, and extending outward, and a nut engaging said bolt and bearing upon said bracket adapted to clamp said shank therein.

3. The combination with a wheel guard or fender and the securing arm or shank therefor, of a bracket projecting from said fender comprising securing-flanges and a U-shaped portion having alined apertures in the opposite sides thereof through which said shank is adapted to pass, an eyebolt sleeved on said shank between the sides of the U and having its threaded portion extending through an aperture in the bottom of the U and a clamping-nut engaging the threaded portion of said bolt.

4. In a wheel guard or fender the combination with a shank or supporting-arm and the guard of a bifurcated bearing formed on the under side of said guard adapted to receive said shank, and means for clamping said shank intermediate said bearing.

In testimony whereof I affix my signature in presence of two witnesses.

DAVID McCAUSLAND.

Witnesses:
 FRANK BRISCOE,
 BENJ. BRISCOE.